US012138884B2

(12) United States Patent
Lattanzi et al.

(10) Patent No.: US 12,138,884 B2
(45) Date of Patent: Nov. 12, 2024

(54) COMBINED MACHINE TO MAKE LAMINAR SEPARATORS OF PRODUCTS CONTAINED IN BOXES AND CRATES

(71) Applicants: Marisa Rosana Lattanzi, Sunchales (AR); Laura Isabel Lattanzi, Sunchales (AR); Fernando Adrian Lattanzi, Sunchales (AR); Carina Adriana Lattanzi, Sunchales (AR)

(72) Inventors: Marisa Rosana Lattanzi, Sunchales (AR); Laura Isabel Lattanzi, Sunchales (AR); Fernando Adrian Lattanzi, Sunchales (AR); Carina Adriana Lattanzi, Sunchales (AR)

( * ) Notice: Subject to any disclaimer, the term of this patent is extended or adjusted under 35 U.S.C. 154(b) by 623 days.

(21) Appl. No.: 17/319,585

(22) Filed: May 13, 2021

(65) Prior Publication Data

US 2021/0354416 A1 Nov. 18, 2021

(30) Foreign Application Priority Data

May 15, 2020 (AR) ............................ P20200101386

(51) Int. Cl.
*B31D 5/00* (2017.01)

(52) U.S. Cl.
CPC .... *B31D 5/0026* (2013.01); *B31D 2205/0082* (2013.01)

(58) Field of Classification Search
CPC .......... B31D 2205/0082; B31D 5/0004; B31D 5/0026
See application file for complete search history.

(56) References Cited

U.S. PATENT DOCUMENTS 3,011,672 A 12/1961 Joseph
3,809,593 A 5/1974 Burke et al.
4,384,442 A * 5/1983 Pendleton ......... B29C 66/81431 53/554
2004/0020040 A1* 2/2004 Arneson .......... G06K 19/07718 156/60
2004/0072385 A1* 4/2004 Bauer ............... H01L 21/67132 257/E23.179
2004/0154161 A1* 8/2004 Aoyama ................ B65G 29/00 29/709
2004/0182261 A1* 9/2004 Fernfors ................. B41F 19/02 101/125
2006/0238345 A1* 10/2006 Ferguson ............. G06K 7/0095 340/572.1
2007/0020801 A1* 1/2007 Ishikawa .......... G06K 19/07745 438/106
2007/0077730 A1* 4/2007 Halope ............... H01L 21/6835 438/455

(Continued)

FOREIGN PATENT DOCUMENTS

CN 1901148 A * 1/2007 ....... G06K 19/07718
EP 1736413 A1 12/2006

(Continued)

*Primary Examiner* — Sonya M Sengupta
(74) *Attorney, Agent, or Firm* — The Morales Law Firm; Joseph L. Morales, Esq.

(57) ABSTRACT

A combined machine to make laminar separators of products contained in boxes and crates, specially designed to make the separators made of at least two laminar sheets of paper that are bound together by an adhesive bond.

17 Claims, 5 Drawing Sheets

(56) References Cited

U.S. PATENT DOCUMENTS

| | | | | |
|---|---|---|---|---|
| 2007/0114659 | A1* | 5/2007 | Cote | H01L 21/67144 257/723 |
| 2007/0137773 | A1* | 6/2007 | Chen | H01L 21/6835 156/235 |
| 2008/0023296 | A1* | 1/2008 | Aoyama | A61F 13/15764 198/460.1 |
| 2008/0121724 | A1* | 5/2008 | Beer | H01L 21/67132 257/E21.526 |
| 2008/0310938 | A1* | 12/2008 | Inoue | H01L 24/83 414/151 |
| 2009/0212297 | A1* | 8/2009 | Watanabe | H01L 21/67126 257/66 |
| 2011/0289772 | A1* | 12/2011 | Kosaka | H01L 24/97 29/832 |
| 2012/0104134 | A1* | 5/2012 | Misumi | H01L 21/6835 242/160.4 |
| 2012/0118506 | A1* | 5/2012 | Kim | B29C 48/22 156/367 |
| 2018/0068986 | A1* | 3/2018 | Yoo | H01L 33/00 |
| 2018/0102350 | A1* | 4/2018 | Kim | H01L 24/81 |
| 2021/0354416 | A1* | 11/2021 | Lattanzi | B31D 5/0026 |

FOREIGN PATENT DOCUMENTS

| | | | | |
|---|---|---|---|---|
| EP | 1746636 | A1 * | 1/2007 | G06K 19/07718 |
| EP | 2592009 | A1 | 5/2013 | |
| KR | 1738304 | B1 * | 5/2017 | B41M 5/265 |
| WO | WO-03065783 | A1 * | 8/2003 | H01L 21/50 |

* cited by examiner

COMBINED MACHINE TO MAKE LAMINAR SEPARATORS OF PRODUCTS CONTAINED IN BOXES AND CRATES

CROSS-REFERENCE TO RELATED APPLICATIONS

This application claims priority from Argentinean application serial number 20200101386 filed on May 15, 2020, which is incorporated herein by reference in its entirety.

BACKGROUND OF THE INVENTION

There are several machines known to work with thick paper reels or even corrugated cardboard or the like that are designed to apply cuts and folds according to the design of the units being formed.

In response to the same functional principle, various models of boxes, cartons and containers are made in an automated manner, using machines that apply weakened folding lines, combined with die-cutting devices.

There are also other devices designed to unwind paper reels and drag the web that emerges towards sectors where it must be treated in order to give conformation to the units of all types and formats that use said raw material.

Also known as "coleros" (A «colero» is an adhesive dispenser a derivation of «cola» that means «adhesive») are those that include built-in adhesive dispensing devices to apply in pre-determined strips establishing definitive bonds among overlapping laminar webs.

In order to make the laminar separators of thick paper that are used inside boxes and crates, the prior art indicates that some of the devices above mentioned have individually been used together with supplementary hand work in order to achieve sets that contain pluralities of packaged separators to be transferred to storage areas.

There is no known specific combination of machines and devices of the aforementioned kind associated to each other, which make up a machine especially designed to produce laminar paper separators.

BRIEF SUMMARY OF THE INVENTION

The machine to make laminar separators of products used inside boxes and crates referred to in this invention, is a novel combination of devices, placed and distributed so that packages containing pluralities of separators properly made according to individual design requirements are prepared in a automatic and complete manner from the corresponding eeder reels of the paper webs.

In this particular case, it is about making separators that include three overlapping laminated plates bonded together by centrally arranged longitudinal adhesive strips, which extend between the opposite sides of the web.

As indicated with the unfolding of each separator, structural conformation is given to a plurality of cells provided to accommodate the bottles that are kept in these boxes and crates.

In a preferred embodiment, the invented machine uses three thick paper reels with a weight between 200 g/m$^2$ and 1,000 g/m$^2$, which are located in respective reel holders, assembled in a freely rotating condition so as to be able to unwind the paper.

The invented machine uses a special frame that has three reel holders, each of which has space for two reels. In the first position is the reel that is being used and in the second position the replacement reel.

Reel loading can be done by means of a bridge crane with an electric winch.

The reel holders are lined up one after the other, so that each developed web passes over the following reel holder and moves forward towards the splicing device that positions each web to enter the adhesive applicator device.

It should be noted that for its operation, this section of the invented machine does not have any power source, neither electrical nor pneumatic, only the winch of the aforementioned bridge crane is powered and a single-phase motor of 220 v is used.

It is also clarified that, depending on the surface size of the plates that give shape to each separator, the feeding reels to be used will be approximately between 15 cm and 35 cm wide in a reel body that has between 70 cm and 140 cm in diameter.

The above mentioned splicing device that is part of the machine of this invention guides the output of three webs so that they run parallel to each other, in horizontal planes of different heights, entering the gluing device where two longitudinal lines of adhesive that extend over the center thereof are placed, namely:

- a first line of adhesive that extends over the front side of the intermediate web facing the lower side of the upper web;
- a second line of adhesive that extends over the front side of the lower web facing the lower side of the intermediate web.

In preferred embodiments, the adhesive dispensers will be pneumatic injection dispensers, theretofore they are associated with a corresponding pneumatic pump through a hose which end is coupled to a dispensing nozzle with a hole that has the width of the adhesive line to be applied.

At the gluing device outlet, the invented machine includes four circular blades that press the paper and stipple the upper and lower paper. This stippling is where the paper must be folded to achieve the shape of the referred cells that will accommodate each of the objects placed therein.

The three webs bonded together, as explained in the preceding paragraphs, form a composite web that is guided towards a section of pressing wheels that ensure the proper adherence of the papers by the effect of the pressure on the webs and the adhesive in-between.

Once the papers have been glued, the invented machine has a device that combines a pair of graphic print applicator rollers. Then, follows the feeding device made up of a pair of traction rollers through which said composite web moves forward intermittently at distances that are equal to the length that each separator being made will have.

For this purpose, the machine has a die-cutting device with male/female blades that makes the individual cut of each separator.

A first pair of upper and lower transversal opposing blades shape the upper edge of each separator. In this case, the upper blade descends and cuts an edge, respecting the design developed therefor, and then returns to the upper position until it receives a new section to repeat the shaping cycle.

Simultaneously a rear cutting blade makes the transversal cut on the opposite side, defining the height that each separator will have.

In preferred embodiments, this die-cutter, for its operation, needs 380V three-phase electrical power and 6 bar pneumatic power, with a servomotor with electronic controller to ensure a precise cut in the required size.

As explained, the already made separators leave one by one the die-cutter device and are deposited on a conveyor belt for storage.

In preferred embodiments, the invented machine has a device for counting the separators and it assembles packages with sets of units that leave the machine and are stacked on an output belt, to be palletized later on.

BRIEF DESCRIPTION OF FIGURES

In order to specify the advantages briefly mentioned, to which users and experts in the field may add many others, and so as to facilitate the understanding of the constructive, constitutive and functional characteristics of the invented machine, a preferred embodiment is described below; same is illustrated, schematically and without a certain scale, in the attached drawings, with the express clarification that, precisely because it is an example, it is not appropriate to assign to it a limiting or exclusive nature of the protection scope of this invention patent, but simply an intention to merely explain and illustrate the basic concept on which it is based.

It is clarified that, in all the figures, like reference numbers and letters, correspond to the same or equivalent parts or constituent elements of the set, according to the example chosen for the present explanation of the invention.

DETAILED DESCRIPTION OF A THE INVENTION

Figure 1:
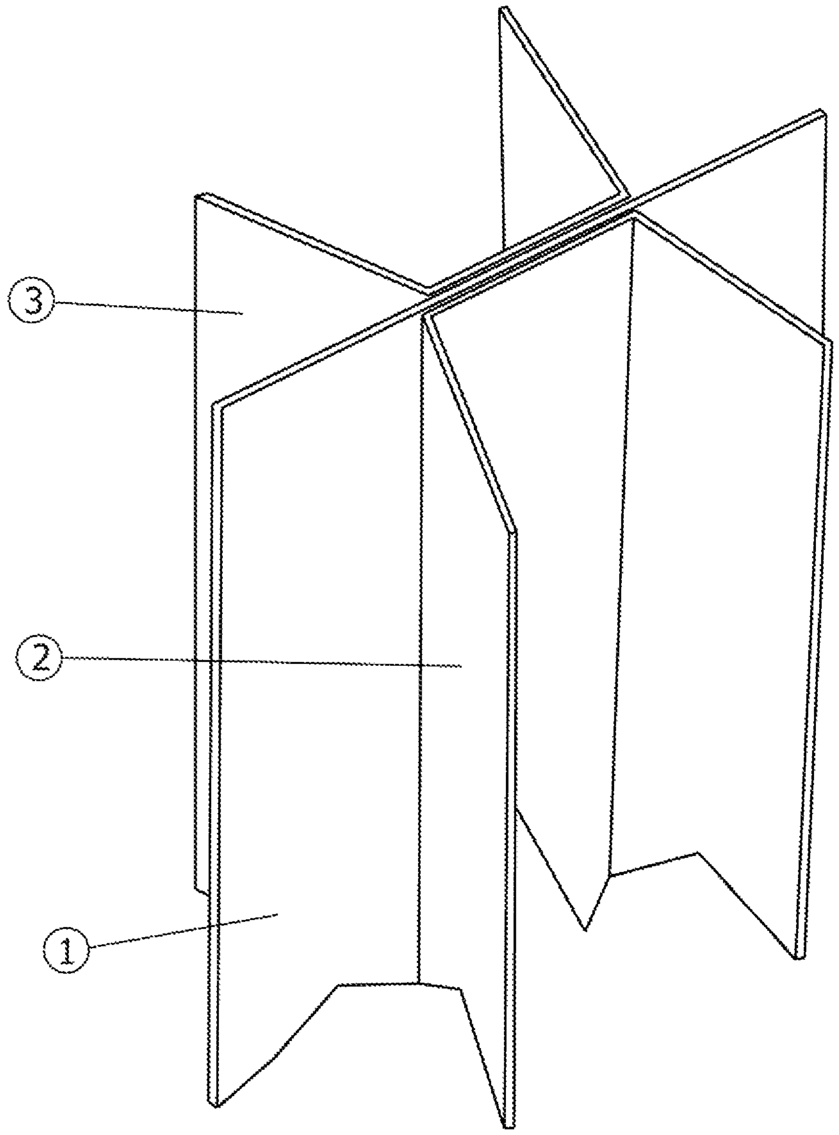
FIG. 1 is a perspective view of a laminar separator that can be made with the machine of this invention.

A combined machine to make laminar separators of products contained in boxes and crates, specially designed to make the separators made of at least two laminar sheets of paper that are bound together by an adhesive bond.

These are laminar separators used to properly distribute and protect glass bottles inside a box, crate or equivalent, preventing them from unwanted damaging or breakage during packaging and transportation.

In preferred embodiments, these laminar separators may be those that comprise three plates of paper of suitable weight (200 $gr/m^2$ to 400 $gr/m^2$), usually quadrangular, that are bound together by means of an adhesive longitudinal strip that runs centrally, combined with weakened folding lines, so that, when deployed, they define individual cells for each bottle. In this way, each bottle is enclosed by the walls of the containing box or crate and by the corresponding partitions provided by the separator.

In this sense, it is hereby stated that the invented machine has specially been created to make the laminar separators identified with the “Separflex” brand, which have been protected by invention patents in several countries based on Argentine patent AR 05039061.

More specifically, the present invention refers to a machine to make laminar separators of the aforementioned kind, herein referred to as “combined” because it is constituted with the combination of four well-defined operating stations so that, starting with the corresponding feeding paper reels, the processes of gluing, marking, die-cutting and subsequent discharge for storage are carried out.

Indeed, the invented machine begins with an initial carrier frame for at least two paper reels arranged one after the other, assembled in a freely rotatable condition.

Each reel is unwind so that its paper web is guided forward up to a splicing device where the first guiding rollers are provided, as many as paper webs must be guided towards the gluing device.

The invented machine includes a second frame where the referred gluing device is placed. It is made up of initial braking devices through which each paper web is guided to be arranged in appropriate horizontal planes. Thereafter, each web runs through a respective guide that guides it to the gluing device, where the web to be glued presents the corresponding side to the respective glue dispenser.

According to this invention the glue dispensers are placed above each web in front of the side that has to receive a longitudinal adhesive strip, after which the same frame includes second guiding rollers that guide the webs to the marking sector. Here, those that require it, are pressed by the respective freely rotating blades generated from weakened folding lines that extend over a longitudinal direction.

The same second frame includes a pair of rotating rollers where the webs overlap and compress against each other, starting a process where the drying of the set takes place. For this purpose, a specific drying section is added to the set. Said section consists of an alignment of pressure rollers lined up in the longitudinal direction. Thus, a composite web is made from which the laminar separators will be formed.

Next, the same invented machine provides the feeding device, through which the paper webs provided by the mentioned feeding paper reels are dragged. This device comprises a first pair of juxtaposed rollers that apply the graphic prints that the separators will carry; immediately after, there follows a pair of traction rollers from where the composite web moves forward towards the die-cutting area.

There follows a new frame where a first male and female die-cutting device is placed, after which there is a corresponding synchronized dragging device that leads the units towards a cutting blade where each separator is defined.

At the end of the die-cutting and cutting device, the units are guided through a conveying belt towards the packing device which function is to take a predetermined quantity of laminar separators and form packages laid flat one on top of the other and guide them towards a storage area.

It is an invention that defines a new combination of devices designed to achieve a superior result, being it unpredictable and surprising even for an expert in the field. Consequently, apart from being new, its design and functional concept show a clear inventive activity, therefore, meeting the conditions required by law to be considered an invention patent.

As can be seen in FIG. 1, the machine referred to in this invention has been conceived to make laminar separators of the type which are made up of three thick paper plates, namely: a flat intermediate plate (1) enclosed by and various plates (2) and (3) that present a “C” shape plan defined from the respective vertical folding lines.

In this exemplary embodiment, it can be seen that these separators, placed inside a box or crate, define six cells provided to accommodate the bottles, or the like, which are kept properly enclosed and laterally protected to prevent unwanted breakage during transport and storage.

Figure 2:
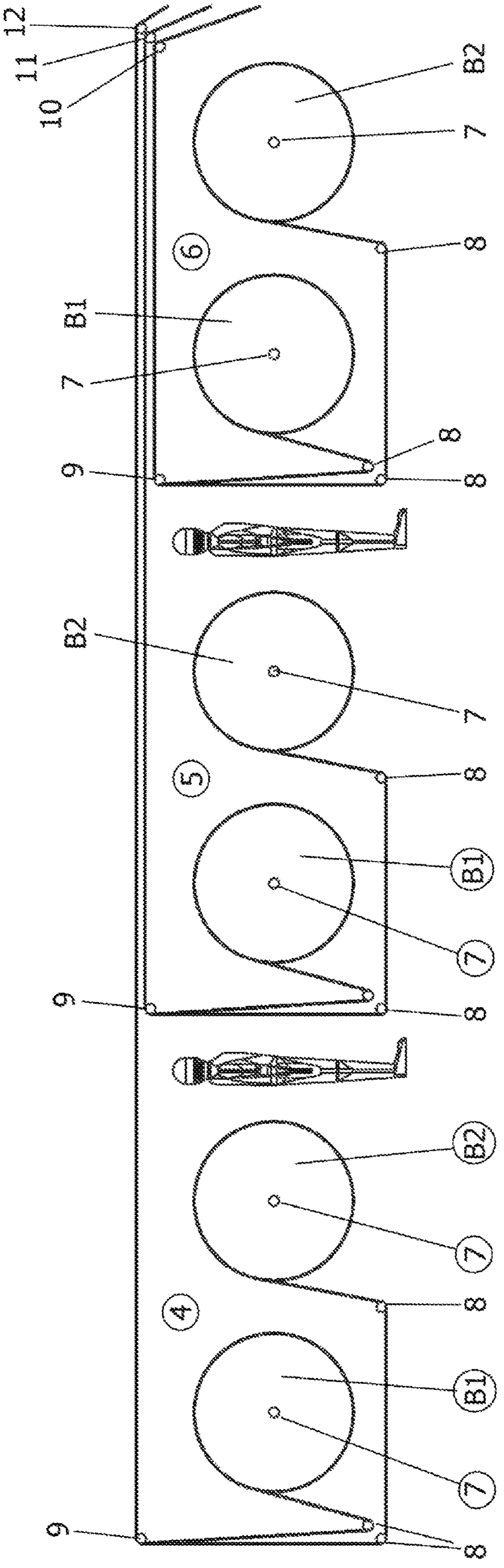
FIG. 2 is a schematic side view showing the reel holder set lined up in a frame containing them.

As shown in FIG. 2, in order to make the separators indicated in the preceding paragraphs, the making machine of this invention is placed on an elongated frame where the paper reels (B) are arranged.

The presence of three reel holders (4), (5) and (6) can be seen, each of which has a pair of reels (B) mounted on respective shafts (7) in freely rotatable condition. One operating reel ($B_1$), and another one as spare reel ($B_2$), are consecutively arranged so as to be incorporated when the former reel has been finished.

In order to unwind the reel, in correspondence with each reel ($B_1$) and ($B_2$) are the respective lower cross-cutting guiding rollers (8) that guide each paper web towards its respective upper guiding rollers (9).

Figure 3:
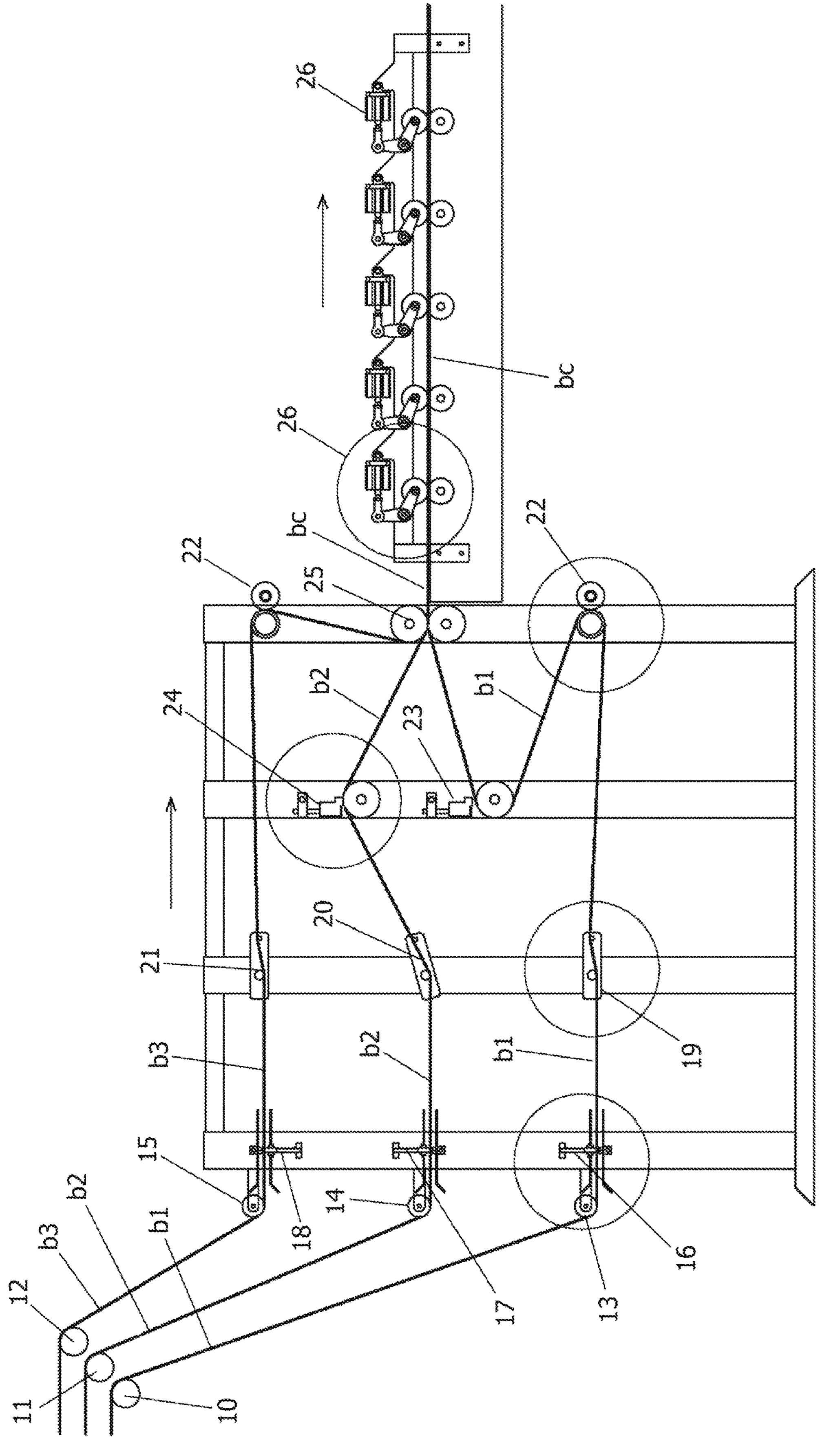
FIG. 3 is also a side view that, in this case, represents the splicing device that is part of the invented machine to be associated with the adhesive applicator device.

As it is also shown in FIG. 3, at one end of the same frame that contains the reel holders, the combined machine of this invention includes a splicing device made up of the cross-cutting guiding rollers (10), (11) and (12), through which the paper webs are arranged at different heights to provide an upper laminar web ($b_1$), an intermediate web ($b_2$) and a lower web ($b_3$).

The same FIG. 3 shows that the invented machine, following the mentioned splicing device defines the adhesive applicator device that it is placed in a second frame, lined up with the previous one.

On said second frame, said paper webs are arranged at different heights in respective horizontal planes, namely: a lower web ($b_1$), an intermediate web ($b_2$), and an upper web ($b_3$), and this is carried out through the respective guiding rollers (13), (14) and (15), following which the incorporated braking devices (16), (17) and (18) are arranged to ensure that the webs remain properly extended over the horizontal plane, moving towards the adhesive dispensers.

Next, each paper web passes through a respective diverting arm (19), (20) and (21) which function is to guide the webs ($b_1$) and ($b_2$) towards a respective adhesive applicator (23) and (24) and the web ($b_3$) directly towards the upper stippling blades (22).

As explained above, each adhesive applicator, in preferred embodiments, may comprise a pneumatic pump that, through a hose, feeds a dispensing device (23) and (24) which outlet nozzle defines the width of the line or strip discharged as the web moves forward. This has not been represented because they are devices already known that do not influence the novelty presented by this invention.

In this same FIG. 3 it can be seen that the mentioned adhesive lines are applied on the front side of the webs ($b_1$) and ($b_2$) that move forward towards the pressing rollers (25), the place where the three webs overlap to conform the composite web (bc).

The same FIG. 3 shows that the invented machine, in the same section of the frame where the referred adhesive applicator device is arranged, there follow several respective pressing blades (22) which function is to make respective weakened folding lines. Specially looking at FIG. 1, it can be seen that, in this case, there are four longitudinal stippled lines that determine the folding lines that plates (2) and (3) have in order to adopt a "C" shape plan.

The same FIG. 3 teaches that the machine of this invention, following the above mentioned adhesive applicator device, defines a drying section that is placed on a third elongated frame, where there is a plurality of pairs of pressing wheels (26) lined up on the central web where the composite web (bc) includes the adhesive.

Figure 4:
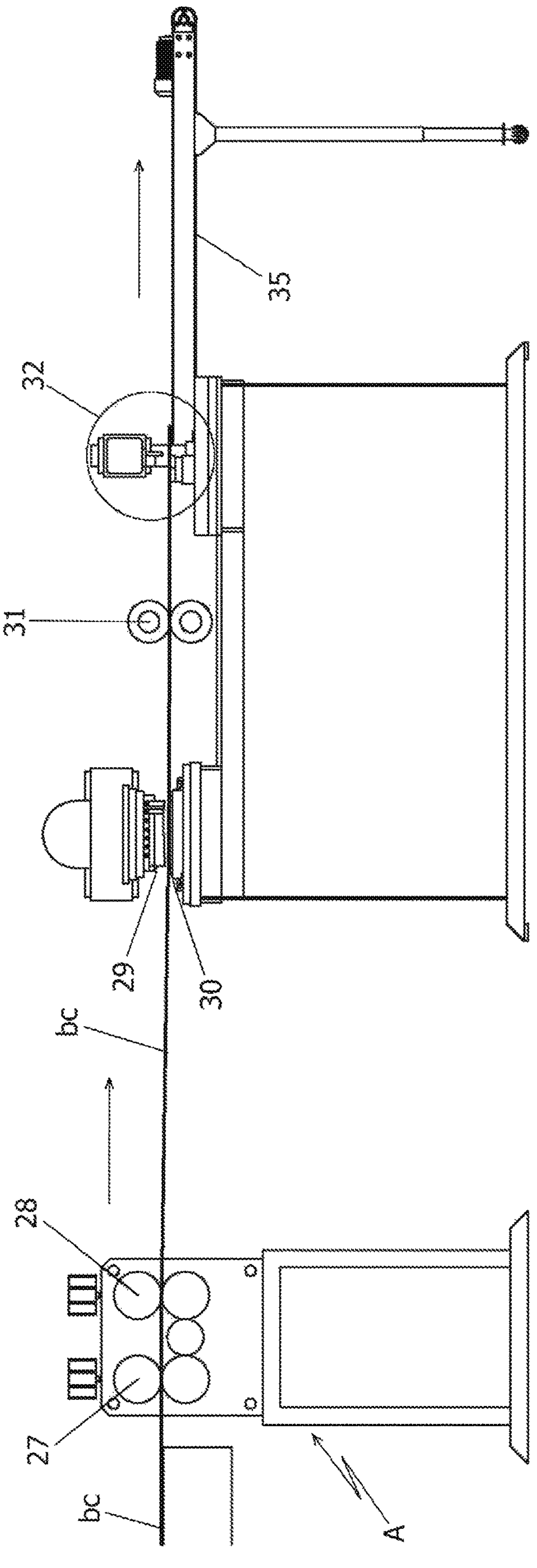
FIG. 4 is also a side view that, in this case, shows the device feeder associated with a downstream die-cutting device.

Looking now at FIG. 4, it can be seen that the invented machine includes a new frame arranged consecutively, in this case, carrying the feeding device (A), through which the web (bc) is dragged and moves forward towards the die-cutting device.

This feeding device (A) has a pair of juxtaposed rollers (27) through which it is possible to apply graphic prints on the exposed sides of the web (bc), after which the traction rollers (28) that produce the dragging of the same web towards the mentioned die-cutting device are placed.

Figure 5:
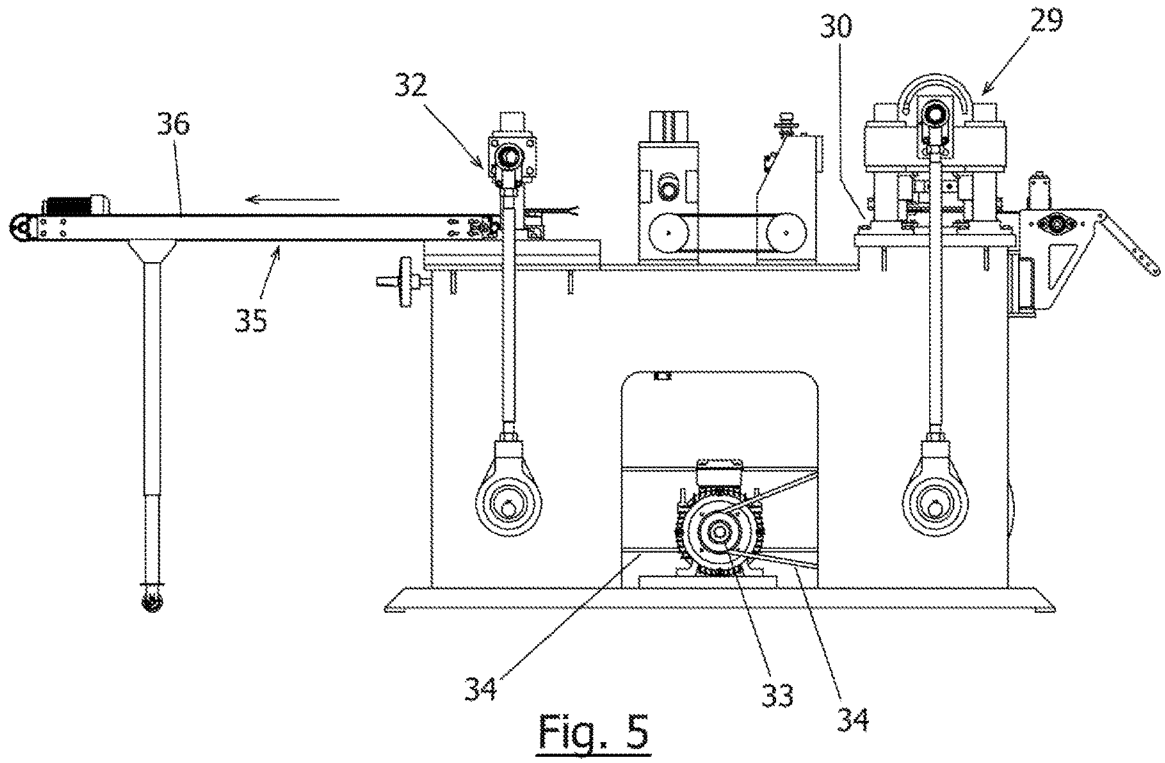
FIG. 5 is a side view of the same die-cutting device of the previous figure.

FIGS. 4 and 5 represent, schematically, the basic combination of devices that are part of the die-cutter of the machine of this invention. Firstly, there is the male die (29); it works on the female die (30) designed to form the upper edge of each separator, following which is the pair of traction rollers (31) that produces the dragging of the separators that are being made. These separators are moved forward towards the final cutting blade (32) that determine the opposite side of each separator (S).

Especially FIG. 5 shows that for the operation of this die-cutter a drive motor (33) is used and which, through the belts (34) transmits the movement to the control mechanisms of both cutting devices.

Figure 6:
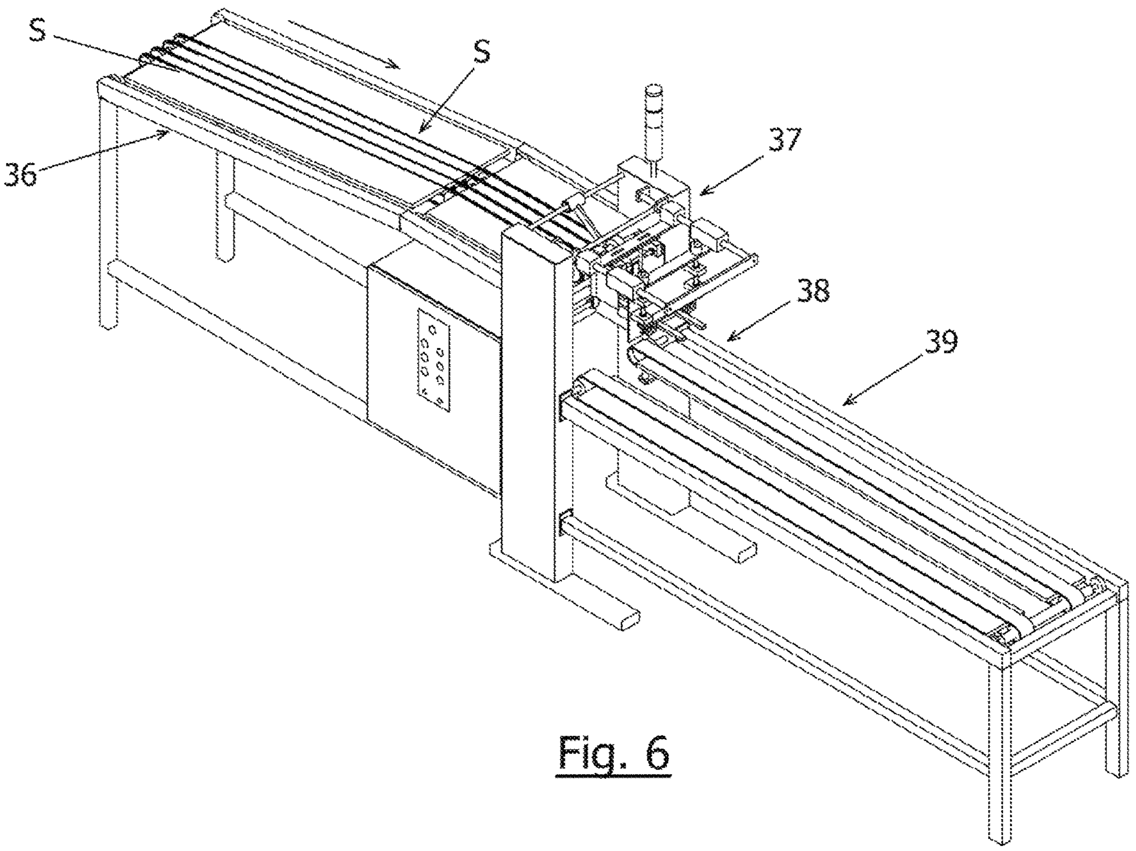
FIG. 6 is a perspective view of a counting and packaging device for the laminar separators already made.

Finally, FIG. 6 shows a table (35) that is arranged following the die-cutter, wherein a conveyor belt (36) individually moves the separators (S) for delivery to a counting and packaging device comprising a counting unit (37). After passing through the counting unit the separators are stacked on a receiving tray (38) wherein bundle packages of separators are prepared, and they accumulate in an output conveyor (39) to be palletized.

The invention claimed is:

1. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging;

wherein the initial frame contains three reel holders, each of which has a pair of reels lined up one after the other, mounted on respective cross-cutting axes in a freely rotating condition.

2. The combined machine to make laminar separators of products contained in boxes and crates of claim 1, wherein in correspondence with each reel, lower and upper guiding cross-cutting rollers that guide the movement forward of each paper web are included.

3. The combined machine to make laminar separators of products contained in boxes and crates of claim 1, wherein the splicing device placed at one end of the initial frame is made up of three guiding cross-cutting rollers, which are arranged at different heights in respective horizontal planes, to provide an upper laminar web, an intermediate web and a lower web.

4. The combined machine to make laminar separators of products contained in boxes and crates of claim 1, wherein the adhesive applicator device comprises first guiding rollers, associated to braking devices to arrange each stretched and extended web in a respective horizontal plane; next, diverting arms are arranged to guide each web towards a respective adhesive applicator and towards corresponding pressing blades that create folding lines.

5. The combined machine to make laminar separators of products contained in boxes and crates of claim 1, wherein each adhesive applicator comprises a pneumatic pump that, through a hose, feeds a dispensing device which outlet nozzle defines the width of the line or strip that is discharged on the moving paper web.

6. The combined machine to make laminar separators of products contained in boxes and crates of claim 1, wherein the drying section is placed on a third elongated frame, carrying a plurality of pairs of longitudinally aligned pressing rollers.

7. The combined machine to make laminar separators of products contained in boxes and crates of claim 1, wherein the feeding device comprises a pair of juxtaposed graphic printing rollers, following which is included a pair of traction rollers that produce the dragging of the composite web.

8. The combined machine to make laminar separators of products contained in boxes and crates of claim 1, wherein the die-cutter is driven by an electrical engine that, through the belts, transmits the movement to the control mechanisms of both cutting devices.

9. The combined machine to make laminar separators of products contained in boxes and crates of claim 1, wherein following the die-cutter, a conveyor belt is incorporated and it individually moves the separators towards a counting and packaging device that includes a counting unit, after which the separators are stacked in a receiving tray wherein bundle packages of separators are prepared.

10. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein in correspondence with each reel, lower and upper guiding cross-cutting rollers that guide the movement forward of each paper web are included.

11. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging; wherein the splicing device placed at one end of the initial frame is made up of three guiding cross-cutting rollers, which are arranged at different heights in respective horizontal planes, to provide an upper laminar web, an intermediate web and a lower web.

12. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein the adhesive applicator device comprises first guiding rollers, associated to braking devices to arrange each stretched and extended web in a respective horizontal plane; next, diverting arms are arranged to guide each web towards a respective adhesive applicator and towards corresponding pressing blades that create folding lines.

13. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein each adhesive applicator comprises a pneumatic pump that, through a hose, feeds a dispensing device which outlet nozzle defines the width of the line or strip that is discharged on the moving paper web.

14. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein the drying section is placed on a third elongated frame, carrying a plurality of pairs of longitudinally aligned pressing rollers.

15. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein the feeding device comprises a pair of juxtaposed graphic printing rollers, following which is included a pair of traction rollers that produce the dragging of the composite web.

16. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein the die-cutter is driven by an electrical engine that, through the belts, transmits the movement to the control mechanisms of both cutting devices.

17. A combined machine to make laminar separators of products contained in boxes and crates, of the type comprising plates of paper of suitable weight, usually quadrangular, which are bound together by centrally extending longitudinal strips of adhesive, combined with weakened folding lines, so that, when unfolded, define individual cells for each product that is enclosed by the walls of the box or crate containing them and by the respective partitions provided by the separator, comprising:

an initial carrier frame of at least two paper reels arranged one after the other, mounted in a freely rotating condition, which paper webs that emerge from the unwinding, extend over a splicing device made up of as many guiding rollers as paper webs are led towards the adhesive applicator device, which is located in a second frame lined up with the previous one, carrying adhesive dispensers, each of which faces one side of the paper webs that receives the longitudinal strip of adhesive, the same frame incorporates corresponding freely rotating blades that generate weakened folding lines, following which a drying section consisting of pairs of pressing rollers lined up in the longitudinal direction is arranged; next, a feeding device is arranged and it consists of at least one pair of traction rollers from where the composite web moves forward towards a die-cutter constituted by a first male and female die-cutting device that forms an edge of each laminar separator, after which there is a corresponding device of synchronized dragging that drives the units towards a cutting blade where each separator is delimited and is individually driven, through a conveyor belt, towards its packaging, wherein following the die-cutter, a conveyor belt is incorporated and it individually moves the separators towards a counting and packaging device that includes a counting unit, after which the separators are stacked in a receiving tray wherein bundle packages of separators are prepared.

* * * * *